(12) United States Patent
Nakagawa

(10) Patent No.: US 6,444,191 B1
(45) Date of Patent: *Sep. 3, 2002

(54) ZEOLITE ZSM-11 AND A PROCESS FOR PREPARING ZEOLITE ZSM-11 USING A 3,5-DIMETHYLPIPERIDINIUM TEMPLATING AGENT

(75) Inventor: Yumi Nakagawa, Oakland, CA (US)

(73) Assignee: Chevron U.S.A. Inc., San Francisco, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/296,019

(22) Filed: Apr. 21, 1999

Related U.S. Application Data

(63) Continuation of application No. 08/688,467, filed on Jul. 30, 1996, now abandoned, which is a continuation of application No. 08/316,010, filed on Sep. 30, 1994, now Pat. No. 5,645,812, which is a continuation-in-part of application No. 08/130,348, filed on Oct. 1, 1993, now abandoned.

(51) Int. Cl.[7] ............................................. C01B 39/36
(52) U.S. Cl. ............... 423/706; 423/718; 423/DIG. 29; 502/62; 502/77
(58) Field of Search ............................... 423/706, 718, 423/DIG. 29; 502/62, 77

(56) References Cited

U.S. PATENT DOCUMENTS

| | | | | |
|---|---|---|---|---|
| 3,709,979 A | * | 1/1973 | Chu et al. | |
| 4,108,881 A | * | 8/1978 | Rollmann et al. | 556/173 |
| 4,229,424 A | * | 10/1980 | Kokotalillo | 423/DIG. 29 |
| 4,366,135 A | | 12/1982 | Le Van Mao et al. | 423/329 |
| 4,391,785 A | | 7/1983 | Rosinski et al. | 423/706 |
| 4,525,466 A | | 6/1985 | Moretti et al. | 502/63 |
| 4,539,193 A | | 9/1985 | Valyocsik | 423/708 |
| 4,568,654 A | * | 2/1986 | Valyocsik | 502/62 |
| 4,622,214 A | | 11/1986 | Comyns et al. | 423/706 |
| 4,661,467 A | | 4/1987 | Kuehl | 502/202 |
| 4,840,780 A | | 6/1989 | Valyocsik | 423/706 |
| 4,894,212 A | * | 1/1990 | McWilliams et al. | 423/706 |
| 4,941,963 A | * | 7/1990 | Valyocsik | 208/46 |
| 5,213,786 A | | 5/1993 | Beck et al. | 423/705 |
| 5,645,812 A | * | 7/1997 | Nakagawa | 423/706 |
| 5,968,474 A | * | 10/1999 | Nakagawa et al. | 423/706 |

OTHER PUBLICATIONS

Jacobs et al., "Synthesis of HIgh–Silica Aluminosilicates Zeolites," Studies in Surface Science and Catalysis, vol. 33, pp. 147–16, 1987.*
Reddy et al., "Crystallization Kinetics of a new Titanium Silicate with the MEL Structure," Zeolites, vol. 12, pp. 95–100, Jan. 1995.*
Lok et al., "The Role of Organic Structure Directing Molecules in Molecular Sieve Synthesis," Zeolites, vol. 3, Oct. 1983.*
Review—"*The role of organic molecules in molecular sieve synthesis*" M. B. M. Lok, T. R. Cannan and C. A. Messina; Zeolites , vol. 3, Oct.
*Chapter III: "Synthesis of High–Silica Zeolites With the Mel Type of Structure*". P.A. Jacobs and J.A. Martens.
"A high resolution NMR and synchrotron x–ray powder diffraction study of zeolite ZSM–11". B.H. Toby et al., pp. 563–569 Journal Mater. Soc. May/Jun. 1988 vol. 3 No. 3.
J. Am. Chem. Soc. 1989—"*Detailed Investigation of the Lattice Structure of Zeolite ZSM–11 by a Combination of Solid–State NMR and Synchrotron X–ray Diffraction Techniques*"—C. A. Fyfe et al. vol. 111, 2470–2474 (No month).
J. Phys. chem. 1991—"*Natural Abundance, Two–Dimensional SI MAS NMR Investigation of The Three–Dimensional Bonding Connectivities In the High–and Low–Temperature Forms of Zeolite ZSM–11*"—C.A. Fyfe et al., 95, 3747–3751 (No month).

* cited by examiner

*Primary Examiner*—David Sample
(74) *Attorney, Agent, or Firm*—Richard J. Sheridan

(57) ABSTRACT

The present invention relates to a process for preparing the zeolite ZSM-11 using 3,5-dimethylpiperidinium compounds as an organic templating agent, and to the zeolite ZSM-11 in the pure phase form.

8 Claims, No Drawings

ZEOLITE ZSM-11 AND A PROCESS FOR PREPARING ZEOLITE ZSM-11 USING A 3,5-DIMETHYLPIPERIDINIUM TEMPLATING AGENT

CROSS REFERENCE TO RELATED APPLICATIONS

This application is a continuation of U.S. application Ser. No. 08/688,467 filed Jul. 30, 1996, now abandoned, which in turn is a continuation of U.S. application Ser. No. 08/316,010 filed Sep. 30, 1994 and issued Jul. 8, 1997 as U.S. Pat. No. 5,645,812, which in turn is a continuation-in-part of U.S. application Ser. No. 08/130,348 filed Oct. 1, 1993 and now abandoned.

BACKGROUND OF THE INVENTION

1. Field of the Invention

The present invention relates to a process for preparing crystalline zeolite ZSM-11 using a templating agent comprising at least one 3,5-dimethylpiperidinium (3,5-DMP) compound, and to zeolite ZSM-11 in pure phase form.

2. State of the Art

Zeolite ZSM-11 and methods for making it are known. For example, U.S. Pat. No. 3,709,979, issued Jan. 9, 1973 to Chu, discloses the preparation of ZSM-11 using quaternary cations of a Group 5-A element, such as ammonium and phosphonium compounds, as the organic templating agent. It does not, however, disclose the 3,5-DMP compounds of this invention as templating agents. U.S. Pat. No. 3,709,979 is incorporated herein by reference in its entirety.

U.S. Pat. No. 4,108,881, issued Aug. 22, 1978 to Rollman et al., teaches the synthesis of ZSM-11 using $C_7$–$C_{12}$ alkylenediamines as the organic templating agent.

U.S. Pat. No. 4,894,212, issued Jan. 16, 1990 to McWilliams et al., discloses a method for synthesizing ZSM-11 using octylamine as the organic templating agent.

U.S. Pat. No. 4,941,963, issued Jul. 17, 1990 to Valyocsik, discloses a method for synthesizing ZSM-11 from a reaction mixture containing a diquaternary ammonium templating agent.

It is alleged that pure ZSM-11 has been synthesized using tetrabutylphosphonium, tetrabutylammonium and 1,8-diaminooctane ($C_8$) and 1,9-diaminononane ($C_9$). See P. A. Jacobs and J. A. Martens, *Studies in Surface Science and Catalysis*, 33, p. 147–166.

Lok et al., in *Zeolites*, 3, 282–291 (1983), disclose numerous compounds which act as templating agents for the synthesis of various crystalline materials, including ZSM-11. This article does not, however, disclose the organic templating agent of the present invention for the synthesis of ZSM-11.

U.S. Pat. No. 5,213,786, issued May 25, 1993 to Beck et al., discloses the synthesis of ZSM-11 using a trimethyl ammonium cation having the formula $C_nN^+(CH_3)_3$ where n is 9, 10, 11, or 12 as the organic templating agent. These trimethylammonium compounds are said to supply the proper pore-filling and charge density balance to produce ZSM-11 at the expense of ZSM-5.

It has now been found that ZSM-11 can be prepared using 3,5-DMP compounds as the templating agent and that the resulting ZSM-11 product is in pure phase form.

SUMMARY OF THE INVENTION

In accordance with the present invention, there is provided a process for preparing the zeolite ZSM-11 which comprises:

(a) preparing an aqueous solution containing sources of (1) an alkali metal oxide, alkaline earth metal oxide or mixtures thereof; (2) an oxide selected from the oxides of aluminum, boron, iron, gallium, indium, titanium, or mixtures thereof; (3) an oxide selected from oxides of silicon, germanium or mixtures thereof; and (4) at least one 3,5-dimethylpiperidinium compound;

(b) maintaining the aqueous solution under conditions sufficient to form crystals of ZSM-11; and (c) recovering the crystals of ZSM-11.

The present invention also provides this process further comprising replacing alkali and/or alkaline earth metal cations of the recovered ZSM-11, at least in part, by ion exchange with a cation or mixture of cations selected from the group consisting of hydrogen and hydrogen precursors, rare earth metals, and metals from Groups IIA, IIIA, IVA, IB, IIB, IIIB, IVB, VIB, and VIII of the Periodic Table of Elements.

The present invention also provides a crystalline material composition, as-synthesized and in the anhydrous state, whose general formula, in terms of mole ratios, is (from about 1 to about 50)Q: (from about 0.5 to about 25) $M_2O$: (less than about 6.7)$W_2O_3$: 100 $YO_2$ wherein: Q is a 3,5-dimethylpiperidinium compound; M is alkali metal cations and/or alkaline earth metal cations; W is aluminum, boron, gallium, indium, iron, titanium, or mixtures thereof; and Y is silicon, germanium, or mixtures thereof.

In accordance with the present invention, there is also provided the zeolite ZSM-11 having no intergrowth within its crystalline structure of any other crystalline structure. In particular, the zeolite ZSM-11 of this invention has no intergrowth of ZSM-5 crystalline structure.

The present invention further provides the zeolite ZSM-11 having no intergrowth within its crystalline structure of any other crystalline structure and having the X-ray diffraction pattern of Table I or Table II below.

The present invention also provides the zeolite ZSM-11 having a $SiO_2/Al_2O_3$ mole ratio of less than 40.

Further provided in accordance with this invention is the zeolite ZSM-11 having a $SiO_2/Al_2O_3$ mole ratio of less than 40 and having a cyclohexane micropore volume of at least about 0.08 ml/g.

Among other factors, the present invention is based on the discovery that the zeolite ZSM-11 can be made using 3,5-dimethylpiperidinium compounds as the organic templating agent. It is especially surprising that, by using these 3,5-dimethylpiperidinium compounds as the templating agent, ZSM-11 can be prepared in essentially pure phase form. Heretofore, it has been difficult to prepare ZSM-11 using conventional templating agents without also crystallizing the closely related zeolite ZSM-5. Also, the present invention permits the synthesis of ZSM-11 with relatively low $SiO_2/Al_2O_3$ mole ratios, i.e., on the order of 25–40. In addition, it has surprisingly been found that the ZSM-11 prepared in accordance with this invention having a $SiO_2/Al_2O_3$ mole ratio of less than 40 has a high cyclohexane micropore volume, ie., at least about 0.08 ml/g.

DETAILED DESCRIPTION OF PREFERRED EMBODIMENTS

In its process embodiment the present invention comprises:

(a) preparing an aqueous solution comprising sources of oxides capable of forming ZSM-11 and at least one 3,5-dimethylpiperidinium compound;

(b) maintaining the aqueous solution under conditions sufficient to form crystals of ZSM-11; and (c) recovering the crystals of ZSM-11.

The Templating Agent

The templating agents useful in the present process are water-soluble 3,5-dimethylpiperidinium compounds which are capable of acting as a templating agent to form ZSM-11. They have a molecular structure of the general form:

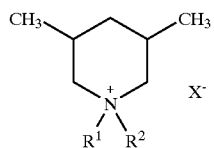

wherein $R^1$ and $R^2$ independently represent an alkyl group, either branched or unbranched, substituted or unsubstituted, containing from 1 to about 7 carbon atoms, with the proviso that $R^1$ and $R^2$ are not both methyl. In addition, $R^1$ and R2 together may comprise a cyclic alkyl ring system, which, including the positively charged nitrogen atom, contains from 4 to 7 atoms, said ring system being unsubstituted or substituted with branched or unbranched alkyl groups having, e.g., one to three carbon atoms. X is an anion which is not detrimental to the formation of the ZSM-11, such as those described below. Preferred 3,5-DMP compounds are 3,5-dimethyl-N,N-diethylpiperidinium compounds; 3,5-dimethyl-N-methyl-N-ethylpiperidinium compounds; spiro 3,5-dimethylpiperidinium compounds such as 1-azonia-3,5, 7-trimethyl-spiro[5.41]decane compounds.

The anion for the salt may be essentially any anion such as halide or hydroxide which is not detrimental to the formation of the molecular sieve. As used herein, "halide" refers to the halogen anions, particularly fluorine, chlorine, bromine, iodine, and combinations thereof. Thus, representative anions include hydroxide, acetate, sulfate, carboxylate, tetrafluoroborate, and halides such as fluoride, chloride, bromide, and iodide. Hydroxide and iodide are particularly preferred as anions.

The Preparation of ZSM-11

The process of the present invention comprises forming a reaction mixture containing sources of alkali and/or alkaline earth metal (M) cations; an oxide of aluminum, boron, iron, gallium, indium, titanium, or mixtures thereof (W); an oxide of silicon, germanium or mixtures thereof (Y); a 3,5-DMP templating agent (Q); and water, said reaction mixture having a composition in terms of mole ratios within the following ranges:

| Reactants | General | Preferred |
|---|---|---|
| $YO_2/W_2O_3$ | 15 and greater | 25 and greater |
| $OH^-/YO_2$ | 0.1–0.6 | 0.15–0.40 |
| $Q/YO_2$ | 0.01–0.50 | 0.02–0.40 |
| $M^+/YO_2$ | 0.01–0.50 | 0.03–0.40 |
| $H_2O/YO_2$ | 15–100 | 20–50 |

In preparing the zeolite ZSM-11 according to the present invention, the reactants and the 3,5-DMP templating agent are dissolved in water and the resulting reaction mixture is maintained at an elevated temperature until crystals are formed. The temperatures during the hydrothermal crystallization step are typically maintained from about 100° C. to about 250° C., preferably from about 140° C. to about 200° C. The crystallization period is typically greater than 1 day and generally about 1 to about 40 days. Preferably the crystallization period is from about 2 to about 20 days.

The hydrothermal crystallization is usually conducted under pressure and usually in an autoclave so that the reaction mixture is subject to autogenous pressure. The reaction mixture can be stirred during crystallization.

Once the crystals have formed, the solid product is separated from the reaction mixture by standard mechanical separation techniques, such as filtration. The crystals are water-washed and then dried, e.g., at 90° C. to 150° C. for from 8 to 24 hours, to obtain the as-synthesized zeolite crystals. The drying step can be performed at atmospheric or subatmospheric pressures.

During the hydrothermal crystallization step, the crystals can be allowed to nucleate spontaneously from the reaction mixture. The reaction mixture can also be seeded with ZSM-11 crystals both to direct, and accelerate the crystallization, as well as to minimize the formation of any undesired crystalline phases. When seed crystals are used, typically 0.1% to about 10% of the weight of silica used in the reaction mixture are added.

Due to the unpredictability of the factors which control nucleation and crystallization in the art of crystalline oxide synthesis, not every combination of reagents, reactant ratios, and reaction conditions will result in crystalline products. Selecting crystallization conditions which are effective for producing crystals may require routine modifications to the reaction mixture or to the reaction conditions, such as temperature, and/or crystallization time. Making these modifications are well within the capabilities of one skilled in the art.

The ZSM-11 product made by the process of this invention has an as-synthesized composition comprising, in terms of mole ratios in the anhydrous state, (from about 1 to about 50)Q: (from about 0.5 to about 25)$M_2O$: (less than about 6.7)$W_2O_3$: 100 $YO_2$ where M, Q, W and Y are as defined above.

The ZSM-11 product was identified by its X-ray diffraction (XRD) pattern. The X-ray powder diffraction patterns were determined by standard techniques. The radiation was the K-alpha/doublet of copper. A scintillation counter spectrometer with a strip-chart pen recorder was used. The peak heights I and the positions, as a function of 2θ where θ is the Bragg angle, were read from the relative intensities, $100 \times I/I_0$ where $I_0$ is the intensity of the strongest line or peak, and d, the interplanar spacing in Angstroms corresponding to the recorded lines, can be calculated.

The X-ray diffraction pattern of Table I is representative of a calcined borosilicate ZSM-11 made in accordance with this invention. Minor variations in the diffraction pattern can result from variations in the silica-to-alumina or silica-to-boron mole ratio of the particular sample due to changes in lattice constants. In addition, sufficiently small crystals will affect the shape and intensity of peaks, leading to significant peak broadening.

TABLE I

Calcined Borosilicate ZSM-11

| d (Å) | $I/I_o \times 100$ |
|---|---|
| 14.04 | 0.50 |
| 11.04 | 84.6 |
| 9.95 | 100.0 |
| 6.66 | 7.5 |
| 5.94 | 16.6 |
| 5.54 | 9.0 |
| 4.98 | 15.1 |
| 4.58 | 4.0 |
| 4.34 | 5.3 |
| 3.82 | 90.3 |
| 3.70 | 25.2 |

TABLE I-continued

Calcined Borosilicate ZSM-11

| d (Å) | I/I$_o$ × 100 |
|---|---|
| 3.32 | 13.8 |
| 3.04 | 5.9 |
| 2.97 | 10.4 |
| 2.00 | 20.4 |

The X-ray diffraction pattern of Table II is representative of a calcined all-silicate ZSM-11 made in accordance with this invention.

TABLE II

Calcined All-Silica ZSM-11

| d (Å) | I/I$_o$ × 100 |
|---|---|
| 14.18 | 1.8 |
| 11.13 | 100.00 |
| 10.02 | 53.7 |
| 6.69 | 9.1 |
| 5.98 | 14.3 |
| 5.56 | 9.1 |
| 5.01 | 5.6 |
| 4.60 | 3.6 |
| 4.35 | 3.9 |
| 3.84 | 53.1 |
| 3.71 | 24.1 |
| 3.48 | 2.7 |
| 3.06 | 7.9 |
| 2.98 | 10.9 |
| 2.00 | 10.5 |

Calcination can also result in changes in the intensities of the peaks as well as minor shifts in the diffraction pattern. The zeolite produced by exchanging the metal or other cations present in the zeolite with various other cations (such as H$^+$ or NH$_4^+$) yields essentially the same diffraction pattern, although again, there may be minor shifts in the interplanar spacing and variations in the relative intensities of the peaks. Notwithstanding these minor perturbations, the basic crystal lattice remains unchanged by these treatments.

The ZSM-11 of this invention is in pure phase form. As used herein, the phrase "pure phase form" refers to the fact that the ZSM-11 of this invention is composed of crystals having only the structure of ZSM-11, i.e., the crystals contain no other crystal structure as an intergrowth with the ZSM-11 structure. It is believed that, heretofore, although "pure" ZSM-11 has been reported as having been prepared, these materials have actually contained some amount of an intergrowth of another crystal structure, typically ZSM-5. One of the principal advantages of this invention is that it provides ZSM-11 without these intergrowths of other crystal structures.

It is believed that the peak in Tables I and II above found at about d=14Å demonstrates that the ZSM-11 of this invention is in pure phase form. This peak is not found in X-ray diffraction patterns of ZSM-11 which contains ZSM-5 intergrowth, and does appear in Tables I and II where it would be expected in a calculated X-ray diffraction pattern for pure phase ZSM-11. In addition, the intensities of the peaks in Tables I and II above are consistent with the intensities expected for a pure phase ZSM-11.

The ZSM-11 of this invention can be prepared having a SiO$_2$/Al$_2$O$_3$ mole ratio lower than conventional ZSM-11 materials. Thus, the ZSM-11 of this invention can be made with a SiO$_2$/Al$_2$O$_3$ mole ratio less than 40, preferably 35 or less, and more preferably about 30.

One surprising characteristic of the ZSM-11 of this invention which has a SiO$_2$/Al$_2$O$_3$ mole ratio below 40 is that it has a high cyclohexane micropore volume. Cyclohexane micropore volume is measured by a method based on that described by G. R. Landolt in Anal. Chem., Vol. 43, No.3, 613–615, 1971. The zeolite is dried by heating overnight at 650° F. in air. It is then loaded into ampoules, placed in the adsorption chamber and evacuated to less than one micron. Following this, the samples are connected to the adsorbate, in this case cyclohexane. The vapor pressure of the cyclohexane is measured with a pressure transducer. The samples are at 22° C. and measurements are usually made at relative partial pressure (P/P$_0$) of close to 0.15. The equilibration process usually takes 3–6 hours. Once the sample has equilibrated, it is removed from the chamber and reweighed to determine the amount of cyclohexane adsorbed.

Using the method described above, the ZSM-11 of this invention having a SiO$_2$/Al$_2$O$_3$ mole ratio below 40 has micropore volumes of at least about 0.08 ml/g, preferably at least about 0.09 ml/g, and more preferably at least about 0.10 ml/g.

Typically, the ZSM-11 crystalline material, is thermally treated (calcined) prior to use as a catalyst. Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica/alumina mole ratio. The zeolite can also be steamed; steaming helps stabilize the crystalline lattice to attack from acids. The zeolite can be used in intimate combination with hydrogenating components, such as tungsten, vanadium molybdenum, rhenium, nickel cobalt, chromium, manganese, or a noble metal, such as palladium or platinum, for those applications in which a hydrogenation-dehydrogenation function is desired. Typical replacing cations can include hydrogen and hydrogen precursors, rare earth metals, and metals from Groups IIA, IIIA, IVA, IB, IIB, IIIB, IVB, VIB, and VIII of the Periodic Table of Elements. Of the replacing cations, hydrogen and cations of metals such as rare earth, Mn, Ca, Mg, Zn, Cd, Pt, Pd, Ni, Co, Ti, Al, Sn, Ga, In and Fe are particularly preferred.

The ZSM-11 prepared by the present process is useful in hydrocarbon conversion reactions. Hydrocarbon conversion reactions are chemical and catalytic processes in which carbon containing compounds are changed to different carbon containing compounds. Examples of hydrocarbon conversion reactions include catalytic cracking, hydrocracking, dewaxing, alkylation, and olefin and aromatics formation reactions.

The following examples demonstrate but do not limit the present invention.

EXAMPLES

There are numerous variations on the embodiments of the present invention illustrated in the Examples which are possible in light of the teachings supporting the present invention. It is therefore understood that within the scope of the following claims, the invention may be practiced otherwise than as specifically described or exemplified.

Example 1

Preparation of 3,5-dimethyl-N,N-diethylpiperidinium hydroxide templating agent (Template A)

200 Grams of 3,5-dimethylpiperidine, 255 grams of potassium bicarbonate and 1700 ml of methanol were added to a 3-liter 3-necked flask which was equipped with a mechanical stirrer, addition funnel and reflux condenser. 794 Grams of ethyl iodide was added to the resulting reaction mixture and, once addition was complete, the mixture was heated for three days at reflux. After cooling, the reaction mixture was concentrated and the desired solids isolated. The product, 3,5-dimethyl-N,N-diethylpiperidinium iodide, was recrystallized from hot acetone/methanol.

Ion exchange to the corresponding hydroxide was achieved using Bio-Rad AG1-X8 anion exchange resin. The hydroxide ion concentration was determined by titration of the resulting solution using phenolphthalein as the indicator.

Example 2

Synthesis of Aluminosilicate ZSM-11

3.66 Grams of a Template A solution (0.614 mmol OH/g) was mixed with 1.1 gram of 1.0 N KOH, 2.52 grams of water and 1.75 grams of Ludox AS-30 aqueous colloidal silica solution (DuPont). Nalco 1SJ612 (alumina coated silica 801: 0.57 gram) was then added to the reaction mixture, which was placed in a Teflon cup. The cup was sealed in a Parr 4745 reactor and heated at 170° C. for 18 days. The settled product of this reaction was filtered, washed with water and determined by XRD to be ZSM-11. The product's $SiO_2/Al_2O_3$ mole ratio was found to be 60.

Example 3

Synthesis of Borosilicate ZSM-11

3.66 Grams of a solution of Template A in its hydroxide form (0.614 mmol OH/g) was mixed with 1.95 grams of 1.0 N NaOH and 6.25 grams of water. Sodium borate (0.057 grams) was dissolved in this solution, and then 0.92 grams of Cabosil M-5 fumed silica was added. This mixture was placed in a Teflon cup which was heated to 160° C. in a Parr 4745 reactor and rotated at 43 rpm. After 10 days, a settled product was obtained which was filtered, washed with water and determined by XRD to be ZSM-11.

Example 4

Synthesis of Borosilicate ZSM-11

3.66 Grams of a solution of Template A in its hydroxide form (0.614 mmol OH/g) was mixed with 1.36 grams of Ludox AS-30 aqueous colloidal silica solution (DuPont). Sodium borate (0.045 grams) was added to this solution and the resulting mixture was stirred until all of the solid had dissolved. This solution was heated to 150° C. in a Blue M oven for 21 days. The product was isolated and determined by XRD to be ZSM-11. Elemental analysis showed this material to have a $SiO_2/B_2O_3$ mole ratio of 116.

Example 5

Synthesis of Borosilicate ZSM-11

4.40 Grams of a solution of Template A in its hydroxide form (0.614 mmol OH/g) was mixed with 1.3 grams of 1.0 N NaOH and 3.30 grams of water. Boric acid (0.124 gram) was dissolved in this solution, followed by the addition of 0.75 gram of Cabosil M-5 fumed silica. This reaction mixture was placed in a Teflon cup which was heated to 160° C. and rotated at 43 rpm. After 19 days, a settled product was obtained, which was determined by XRD to be ZSM-11.

Example 6

Synthesis of Aluminosilicate ZSM-11 With $SiO_2/Al_2O_3$ Mole Ratio Less Than 40

0.30 gram of Template A in its hydroxide form (0.614 mmol OH/g) was mixed with 0.20 gram of solid KOH, 0.08 gram of Reheis F2000 hydrated aluminum hydroxide and 11.4 grams of water. To this solution was added 0.90 grams of Cabosil M-5 fumed silica (98% $SiO_2$). 0.18 Gram of isopropylamine was next added dropwise and the resulting mixture was stirred in a 23 ml Teflon cup for a Parr 4745 reactor. The reactor was sealed and heated to 170° C. on a rotating spit (43 rpm) of a Blue M oven. After 8 days, the reaction was complete and the product was filtered, washed with water and air-dried. The resulting product was determined by XRD to be ZSM-11, and had a $SiO_2/Al_2O_3$ mole ratio of 31.

Example 7

Synthesis of Aluminosilicate ZSM-11

0.49 gram of Template A in its hydroxide form (0.614 mmol OH/g) was mixed with 0.20 grams of solid KOH, 0.68 gram of Reheis F2000 hydrated aluminum hydroxide and 11.4 grams of water. To this solution was added 0.90 grams of Cabosil M-5 fumed silica (98% $SiO_2$) and 0.005 gram of ZSM-11 crystals as seeds. The resulting mixture was stirred in a 23 ml Teflon cup for a Parr 4745 reactor which was then sealed and heated to 170° C. on a rotating spit (43 rpm) of a Blue M oven. After 7 days, the reaction was complete and the product was filtered, washed with water and air-dried. The resulting product was determined by XRD to be ZSM-11.

Example 8

Calcination

The product from Example 6 was calcined in the following manner. A thin bed of material was heated in a muffle furnace from room temperature to 120° C. at a rate of 1° C. per minute and held at 120° C. for three hours. The temperature was then ramped up to 540° C. at the same rate and held at this temperature for five hours, after which it was increased to 594° C. and held there for another five hours. A 50/50 mixture of air and nitrogen was passed over the zeolite at a rate of 20 standard cubic feet per minute during heating.

Example 9

Micropore Volume of ZSM-11

The nitrogen micropore volume of the calcined material from Example 8 was found to be 0.15 cc/g, and the BET area was 382 $M^2/g$. The cyclohexane micropore volume was determined to be 0.103 cc/g (8.0 wt%) at a $P/P_O$ of 0.15 at temperature 22° C.

The cyclohexane micropore volume was determined (temperature=22° C.; P/Po=0.13) for those materials shown in the table below. In some cases, the ZSM-11 was made using a mixture of isobutylamine (IBA) and Template A(A).

| Sample | $SiO_2/Al_2O_3$[a] | Cyclohexane (ml/g) | IBA/Si[a] | A/Si[a] |
|---|---|---|---|---|
| ZSM-11[b] | 33 | 0.0799 | 0.21 | 0.02 |
| ZSM-11[b] | 33 | 0.095 | — | 0.02 |
| ZSM-11[b] | 50 | 0.1057 | — | 0.15[e] |
| ZSM-11[b] | 33 | 0.0913 | 0.21 | 0.02 |
| ZSM-11[b] | 33 | 0.0875 | 0.15 | 0.02 |
| ZSM-11[b] | 33 | 0.0897 | 0.10 | 0.02 |
| ZSM-11[b] | 33 | 0.0877 | 0.05 | 0.02 |

-continued

| Sample | SiO$_2$/Al$_2$O$_3$[a] | Cyclohexane (ml/g) | IBA/Si[a] | A/Si[a] |
|---|---|---|---|---|
| ZSM-5[c] | — | 0.0377 | — | 0.15[f] |
| ZSM-11/ZSM-5[d] | 50 | 0.0542 | — | 0.15[e] |

[a]Mole ratio in reaction mixture. Mole ratio in product is expected to be slightly lower.
[b]ZSM-11 in pure phase form made in accordance with this invention
[c]For comparative purposes
[d]An intergrowth of ZSM-11 and ZSM-5 for comparative purposes
[e]Template used was tetrabutylammonium cation
[f]Template used was tetrapropylammonium cation.

Example 10

Ion Exchange

Ion-exchange of the calcined ZSM-11 material of Example 8 is executed using NH$_4$NO$_3$ to convert the zeolite from its Na$^+$ to its corresponding NE$_4$,form, and ultimately, the H$^+$form. Typically, the same mass of NH$_4$NO$_3$ as zeolite is slurried in water at a mass ratio of 25–50:1 water to zeolite. The exchange solution is heated at 95° C. for 2 hours and then filtered or decanted. The process can be repeated up to three times. Following the final exchange, the zeolite is filtered, washed several times with water, and dried. This NH$_4$,form of ZSM-11 can then be converted to the H$^+$form by calcination as described in Example 8 to 540° C.

Example 11

Synthesis of All-Silica ZSM-11

3.66 Grams of a solution of Template A in its hydroxide form (0.614 mmol OH/g) was mixed with 1.5 g of 1.0 N KOH and 6.71 g of water. 0.92 Gram of Cabosil M-5 fumed silica was then added to the solution and the resulting mixture was stirred until it was homogeneous. Seeds of ZSM-11 (0.006 g) were added to the mixture and the resulting mixture was heated to 160° C. in a Parr 4745 reactor and rotated at 43 rpm. After three days, a settled product was obtained which was filtered, washed with water and determined by X-ray diffraction to be ZSM-11 in the pure phase form.

What is claimed is:

1. The zeolite ZSM-11 having no intergrowth within its crystalline structure of any other crystalline structure.
2. The zeolite of claim 1 having the X-ray diffraction pattern of Table I.
3. The zeolite of claim 1 having the X-ray diffraction pattern of Table II.
4. The zeolite ZSM-11 having no intergrowth of ZSM-5 crystalline structure.
5. The zeolite ZSM-11 having a SiO$_2$/Al$_2$O$_3$ mole ratio of about 30 to about 40.
6. The zeolite of claim 5 having a cyclohexane micropore volume of at least about 0.08 ml/g.
7. The zeolite of claim 6 wherein the cyclohexane micropore volume is at least about 0.09 ml/g.
8. The zeolite of claim 7 wherein the cyclohexane micropore volume is at least about 0.10 ml/g.

* * * * *